APPARATUS FOR SILENCING VIBRATIONAL ENERGY

Filed March 31, 1959 5 Sheets-Sheet 1

INVENTOR.
CLAYTON H. ALLEN
GUENTHER KÜRTZE
BY
Rines and Rines
ATTORNEYS

Dec. 10, 1963 C. H. ALLEN ETAL 3,113,635

APPARATUS FOR SILENCING VIBRATIONAL ENERGY

Filed March 31, 1959 5 Sheets-Sheet 2

INVENTORS
CLAYTON H. ALLEN
GUENTHER KURTZE
BY
Rines and Rines
ATTORNEYS

APPARATUS FOR SILENCING VIBRATIONAL ENERGY

Filed March 31, 1959 5 Sheets-Sheet 3

INVENTORS
CLAYTON H. ALLEN
GUENTHER KURTZE
BY Rines and Rines
ATTORNEYS

INVENTORS
CLAYTON H. ALLEN
GUENTHER KÜRTZE
BY Rines and Rines
ATTORNEYS

Dec. 10, 1963 C. H. ALLEN ETAL 3,113,635

APPARATUS FOR SILENCING VIBRATIONAL ENERGY

Filed March 31, 1959 5 Sheets-Sheet 5

INVENTORS
GUENTHER KÜRTZE
CLAYTON H. ALLEN
BY Rines and Rines
ATTORNEYS

United States Patent Office 3,113,635

Patented Dec. 10, 1963

3,113,635
APPARATUS FOR SILENCING VIBRATIONAL ENERGY

Clayton H. Allen, Wellesley, and Guenther Kürtze, Arlington, Mass., assignors to Bolt Beranek and Newman Inc., Cambridge, Mass., a corporation of Massachusetts Filed Mar. 31, 1959, Ser. No. 803,141
31 Claims. (Cl. 181—42)

The present invention relates to methods of and apparatus for silencing vibrational energy and, more particularly, though not exclusively, to exhaust-type mufflers for automobile engines or similar devices in which the acoustic energy accompanying the flow of a high-speed stream of gases must be quieted.

The acoustic noise involved in an automobile exhaust or the like has many frequencies varying approximately from 50 cycles upward through the audible spectrum. Although there may be several pure tones and harmonics in this exhaust noise, these generally vary in frequency with the change in motor speed and therefore cover a broad frequency range. There are also random noise frequencies throughout the entire spectrum which must be attenuated. For these purposes, therefore, a muffler must have a broad frequency response in order to be fully effective.

Many prior-art exhaust mufflers and the like employ either resonant or other tuned acoustical elements, however, that are active only over a limited frequency range. Some mufflers employ a relatively complicated path or labyrinth for the exhaust gases in an attempt to reduce the noise. This labyrinth-type of muffler generally involves a large amount of back pressure which reduces the performance of the engine. Other mufflers employ a straight-through exhaust path with acoustical materials surrounding this exhaust path for the absorption of sound. Such mufflers, although having a lower pressure drop, suffer from the fact that the acoustical materials may be damaged by the high intensities of the sound and they may also be contaminated and partially clogged by exhaust materials deposited in the course of the engine operation.

An object of the present invention is to provide a new and improved method of and apparatus for silencing, muffling, damping or attenuating vibrational energy, such as acoustic energy; the terms "vibration," "sound" and "acoustic" being employed herein generically to embrace all kinds of elastic vibrations whether carried by a fluid flow or by conduction, and whether audible, sub-audible or super-audible.

An additional object of the present invention is to provide a new and improved muffler or silencer that shall not be subjected to the above-mentioned or other disadvantageous features of the prior art.

A further object is to provide an acoustic silencing device that is of more general applicability, also, and that embodies the concept of a pair of vibrational-wave propagating paths having substantially different wave velocities and appropriately coupled together over an appropriate or substantial portion of their extent.

Other and further objects will explained hereinafter and will be more particularly pointed out in connection with the appended claims.

The invention will now be described with reference to the accompanying drawing

FIG. 1 of which is a perspective view of one embodiment thereof;

Figure 7:
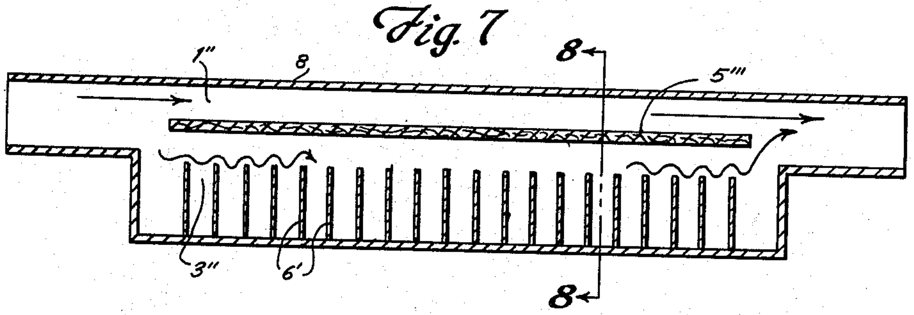
Figure 8:
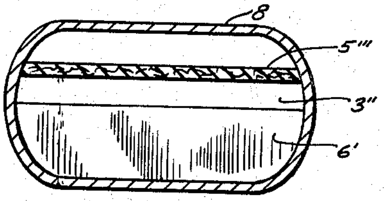
Figure 9:
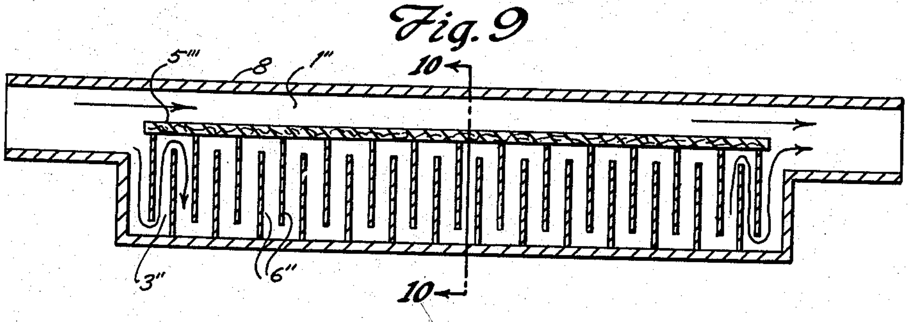
Figure 10:
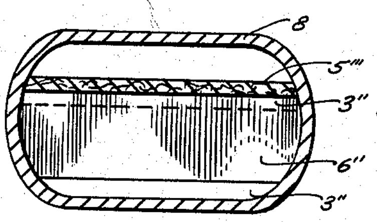
Figure 11:
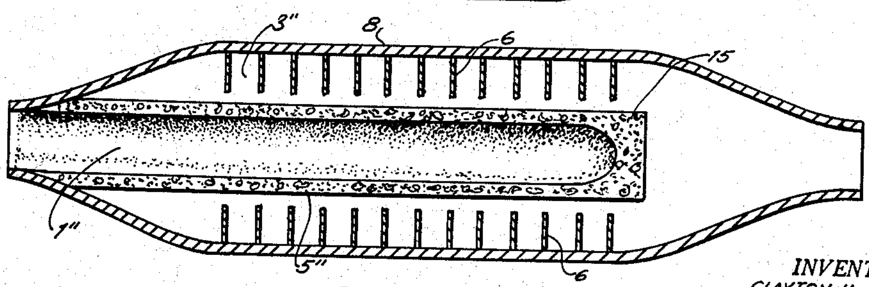

FIGS. 7 and 9 are longitudinal sections of still additional muffler constructions embodying the invention, FIGS. 8 and 10 being, respectively, transverse sections taken along the respective lines 8—8 of FIG. 7 and 10—10 of FIG. 9, looking in the direction of the arrows;

FIG. 11 is a similar longitudinal section of another modification; and

Figure 12:
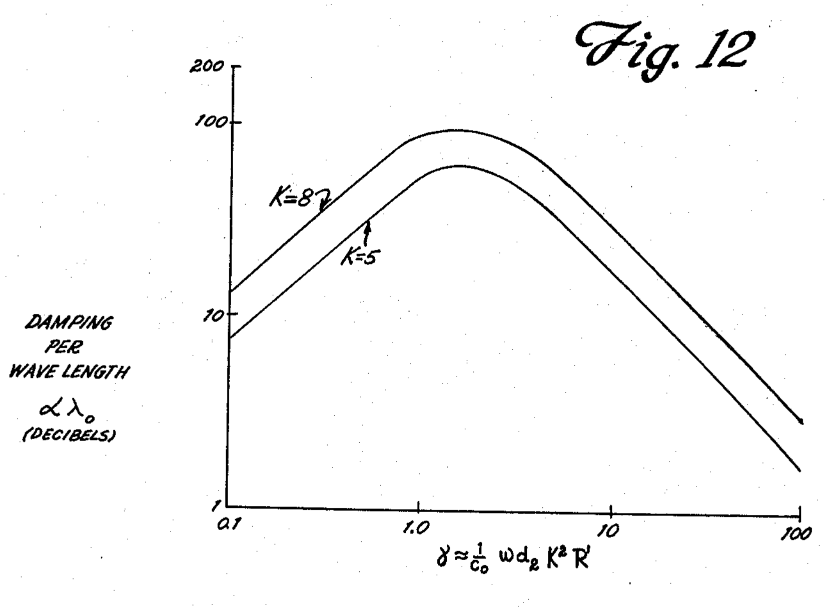
Figure 13:
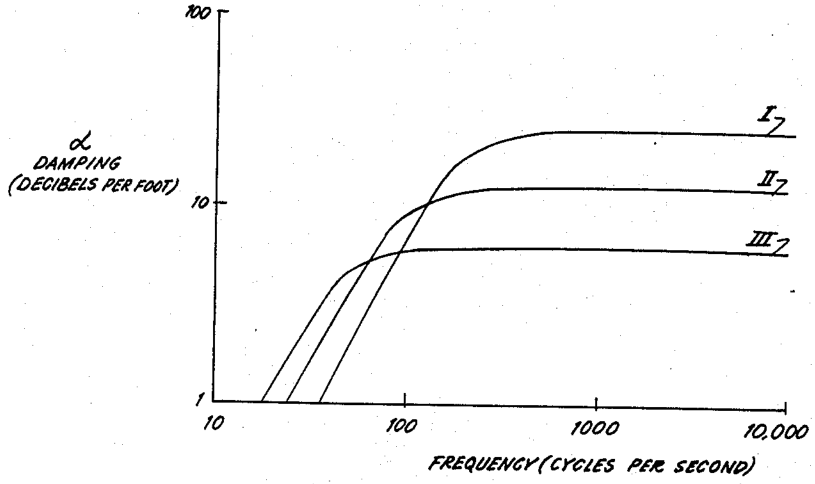

FIGS. 12 and 13 are graphs illustraive of the performance of particular embodiments of the invention.

Figure 1:
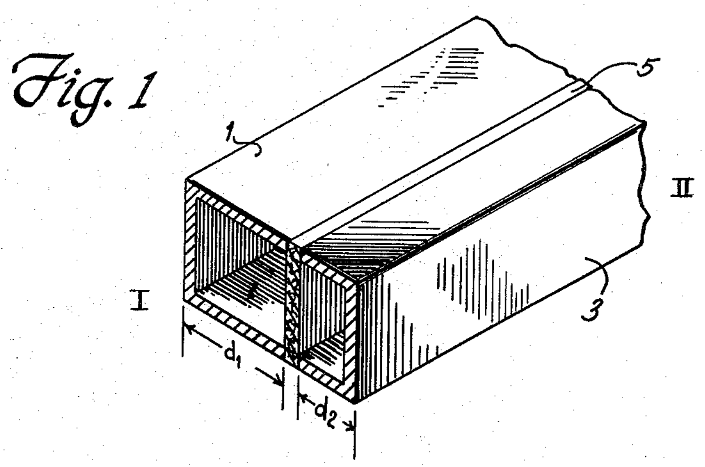

Referring to FIG. 1, the muffler of the present invention is illustrated in the particular form of a sound-attenuating device that employs two paths, shown as rectangular conduits, pipes or tubes 1 and 3, hereinafter generically referred to as tubular, through which acoustic energy may propagate from a region I at one end to a region II at the other end, at substantially different velocities and hence with different wavelengths therealong. The paths 1 and 3 communicate with each other along a substantial portion of their length, preferably substantially throughout the length, in the direction of the axis of the device, by means of an acoustic coupling 5, serving as the left-hand bounding wall of the tube 3 and the right-hand bounding wall of the tube 1, which presents an acoustic impedance with a substantial real or resistive part to the passage of vibrational waves from one path to the other. Such an acoustic coupling medium 5 may be a perforated or porous sheet or wall or the like, as shown, or any other coupling medium having an acoustic resistance of proper value.

The necessary difference in velocity in the two paths may be attained in many ways, such as, for example, by the use of two different gases or other media within the two paths 1 and 3; by the use of different temperatures in the two paths; by the use of different path geometry; or by introducing delaying devices into one of the paths. A muffler of this design operates so as to create a gradually increasing phase lag in one path relative to the other. The sound in the two paths 1 and 3 will aid in producing an alternating air flow transversely between the two paths through the acoustic resistance 5; the alternating air flow being greatest at regions where the phases in the two paths differ by substantially 180°, and varying sinusoidally in magnitude from this maximum to substantially zero in regions of zero phase-difference. Optimum performance, indeed, is obtained by the use of purely resistive acoustic coupling 5 between the two paths 1 and 3, as later discussed. For maximum absorption, the acoustic resistance of the coupling 5 must be approximately equal to the geometric mean of the acoustic impedance as seen from one path or tube to the other. Since, in the case where the path or tube cross-sectional dimensions are less than a quarter wavelength of each of the acoustic frequencies $\omega$ to be silenced, the normal acoustic impedance of an element of length of one tube, as seen from the adjacent element of length of the other, is substantially a capacitive reactance, the impedance decreases with frequency. Thus, at high frequencies $\omega$ the optimum resistance will be small, and vice versa.

If the absorption obtained from this device is measured in decibels/wavelength, then for a given value of resistance in the coupling 5 between the two paths 1 and 3, there will be a frequency of maximum sound attenuation and a gradual decrease in attenuation (approaching a drop of six decibels per octave) at higher and lower frequencies.

As before indicated, moreover, there is also an optimum vlue of acoustic resistance R' of the coupling medium 5 for producing optimum damping per wavelength. The relationship between the damping per wavelength (expressed in units of decibels as the product of the attenuation $\alpha$ and wavelength $\lambda_0$ in the path 1 of velocity $c_0$), and the effective ratio $\gamma$ of the resistance of the coupling 5 to the reactance looking into the other path 3, indicated along the ordinate, is plotted in FIG. 12 for the two cases of a ratio $\kappa=5$ and $\kappa=8$ of velocities in the paths 1 and 3, where the ratio $x$ of cross-dimensions $d_1/d_2$ of the paths 1 and 3 was 2. The value of the ratio $\gamma$ for which optimum damping per wavelength is maximum, is indicated as substantially 1.5. It has been found that for optimum ratios of $x$ (i.e., $d_1/d_2$) ranging from about 2 to 2.5, values of $\gamma$ for obtaining maximum damping per wavelength lie within a range of from substantially 1 to substantially 4. The expression relating the damping per wavelength $\alpha\lambda_0$ with the ratio $\gamma$ has been determined to be substantially $$\alpha\lambda_0=8.6\pi\frac{\gamma x\sqrt{x}(\kappa^2-1)}{\kappa^2[1+x(1+\gamma^2)]}\sqrt{\frac{x+\kappa^2(1+x\gamma^2)}{1+x(1+\gamma^2)}} \quad (1)$$

The relationship between $\gamma$ and R′ is determined to be substantially $$\frac{1}{\gamma}=\frac{1}{R'}\frac{c_0}{\omega d_2}\frac{[1+x(1+\gamma^2)]}{(\kappa^2-1)x(1+\gamma^2)} \quad (2)$$

which, for the case of ratios $x$ and $\kappa$ greater than unity, reduces to the approximate relationship $$\gamma\doteq\frac{1}{c_0}\omega d_2\kappa^2R' \quad (3)$$

In actual practice, accordingly, one selects a ratio $\gamma$ preferably within the before-indicated optimum range, and a predetermined velocity or wavelength ratio $\kappa$ (preferably of the order of the before-mentioned value of 8 in the case of automotive mufflers and the like), and one determines the lowest vibrational frequency corresponding to the angular velocity $\omega$ that is to be effectively damped. From the graphs of FIG. 12, the value of $\gamma$ for optimum damping per wavelength (there indicated as about 1.5) is selected. The necessary acoustic resistance R′ for the coupling 5 is then computed from the above equations. Thus, for a predetermined length and size of muffler ($d_2$=2 inches), curves I, II and III of FIG. 13 are presented for respective values of $R'=0.17\rho c_0$, $0.34\rho c_0$ and $0.68\rho c_0$ (where $\rho$ is the density of the medium in path 3), with the damping or attenuation $\alpha$, expressed in decibels per foot, being plotted along the ordinate, as a function of frequency, plotted along the abscissa in cycles per second. A cut-off frequency of about 200 cycles was selected in curve I; about 100 cycles, in curve II; and about 50 cycles, in curve III. The attenuation is shown to rise at low frequencies at approximately 12 decibels per frequency doubling, until a substantially horizontal plateau is reached; the value of this plateau of attenuation being determined primarily by the length of the exhaust muffler, the value of the acoustic resistance R′, and the ratio $\kappa$ of the speed of sound in the two paths. At high frequencies, therefore, the attenuation is substantially constant, because as the frequency increases, the loss in attenuation per wavelength is just offset by the increase in the number of wavelengths in a given length of muffler.

The length of muffler 1, 3, 5, of course, depends upon the lowest frequency which must be attenuated or damped and the amount of attenuation or damping required. In particular, a practical muffler can be made approximately 3 ft. long and approximately 4 in. in diameter with an attenuation of approximately 40 decibels at frequencies above approximately 100 cycles per second. As indicated in FIG. 12, upper curve, one can, with this type of muffler design, obtain a transmission loss approximating to 100 decibels per free-space wavelength, when the effective speeds of sound in the two paths 1 and 3 are different by a factor of 8. The damping can be made even higher, of course, with higher ratios of speeds.

While the invention has heretofore proceeded with the illustrative example of substantially rectangular- or square-cross-section substantially parallel paths 1 and 3, other configurations may also be employed, the paths being fed from an input, and exhausting at an output. As will later be evident, however, vibrational damping operation can be obtained also, by allowing one of the paths to be fed only or principally through the resistive coupling between it and the other path. Thus, in FIGS. 2 and 3, a substantially cylindrical inner tubular path 1′ is shown provided with a second circuitous tubular path 3′ wound spirally or helically thereabout (the term "helically" being used generically) to provide a substantially different path length. At the interface between the paths 1′ and 3′, each path is provided with cooperating coupling slots or apertures 2 and 4. As before stated, the inter-path coupling preferably has a large acoustically resistive component, which may be obtained by porous filling 5′, as before discussed, or by other coupling media or mechanisms including membranes, perforated resistive sheets or other well-known apparatus having this property. These slots may be designed to be substantially an acoustic resistance in themselves or may be covered by or filled with a porous material offering substantial acoustic resistance. The coupling slots 2, 4 must be effective along a substantial portion of the path interface, preferably continuously throughout, though operation can be achieved with a plurality of spaced slot position sof the required extent.

Figure 2:
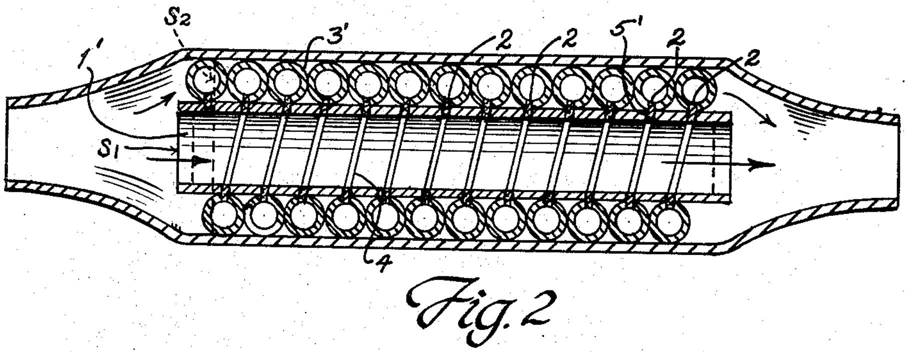
FIG. 2 is a longitudinal section of a preferred modification and FIG. 3 is a similar view upon an enlarged scale of a fragment of the muffler of FIG. 2.
Figure 3:
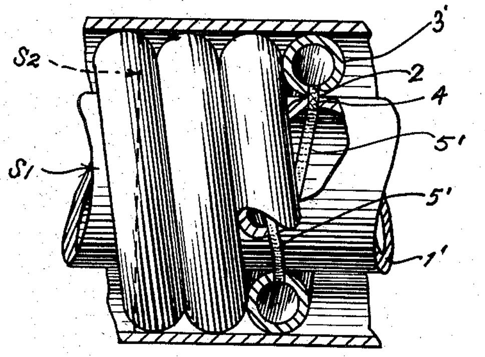

Instead of expressing the ratio $x$ in terms of cross-dimensions $d_1$ and $d_2$, FIG. 1, it has been found that the ratio $x'$ should be considered for the embodiment of FIGS. 2 and 3, defining the ratio of cross-sectional areas $S_1$ and $S_2$ (the latter being the effective transverse open area within substantially one turn of the spiral) of the paths 1′ and 3′ normal to the longitudinal axis of the muffler. Again, an optimum ratio $x'$ is substantially 2 to 2.5. Equation 2 then takes the form of $$\frac{1}{\gamma}=\frac{1}{R'}\frac{c_0h_3}{\omega S_2}\frac{[1+x'(1+\gamma^2)]}{(\kappa^2-1)x'(1+\gamma^2)} \quad (4)$$

where $h_3$ is the width of the slots 2, as measured in a plane normal to the axis of the muffler, with Equation 4 reducing, in the case of $x'$ and $\kappa$ greater than unity, to substantially $$\gamma=\frac{R'\omega S_2\kappa^2}{c_0h_3} \quad (5)$$

It will be noted, further, that with the spiral-tube design of FIGS. 2 and 3, the gas or other fluid medium in the spiral tube 3′ may be cooler than that in the central tube 1′, thereby even further to decrease the acoustic velocity therein relative to that in the central tube. This acts to the advantage of the muffler since it increases the velocity ratio $\kappa$. For optimum design, as before stated, the resistance of the coupling 2—5′—4 is properly chosen to provide attenuation substantially independent of frequency, FIG. 13, with the frequency of the optimum attenuation being a function of the resistance and increasing inversely as the resistance. In some cases, it will be desirable to increase the pore size of the resistive material 5′, the resistance of which will then decrease with increasing frequency. This would enable maintaining the optimum value of R′ over a band of frequencies.

Calculations of the attenuation realizable from this type of spiral muffler indicate that, if the resistance of the coupling 2—5′—4 between the straight-through path 1′ and spiral tube 3′ is adjusted to the proper value, then the damping per wavelength may approach 100 decibels, FIG. 12. While the adjustment of the value of resistance R′ of the coupling 2—5′—4 is most important, the value of damping per wavelength will still be greater than 0.7 maximum for a range of resistance varying by a factor of two either side of its optimum value.

For a muffler constructed in accordance with the invention having a given wave-velocity ratio $\kappa$ and acoustic resistance R′ between the two paths, the total attenuation obtained at any frequency will increase with increase in length of the muffler. The attenuation or damping per unit length at the beginning of the muffler, in the region where steady-state wave propagation within the muffler is not yet established, will rise from a zero value to the before-mentioned optimum value of approximately 100 db per wavelength, which represents the steady-state optimum attenuation.

The paths 1 and 3 or 1′ and 3′ need not, however, be tubular or even fluid-containing. They need only be paths for the propagation of vibrational waves, including rods, plates and other structures. The phrase "conduit for conducting vibrational energy" is used generically to designate any such path. As a further example, the circuitous path 3″, FIG. 4, may be formed by a helical-baffle structure 6 within a conduit 8, and with the helical structure 6 axially apertured to provide a straight-through tubular path 1″ bounded by a resistive wall 5″, as before discussed.

Figure 5:
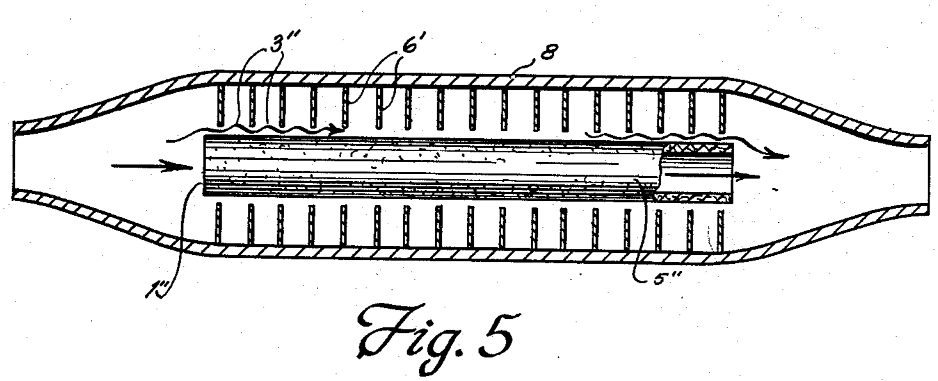
Figure 6:
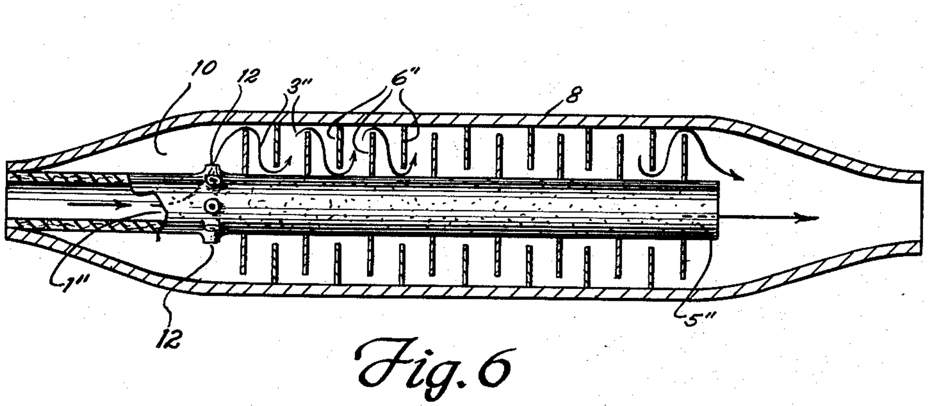

As other illustrations, the helical-baffle structure may be replaced by zig-zag path-producing parallel baffles 6′, FIG. 5, or by alternate oppositely projecting staggered baffles 6″, FIG. 6. The parallel baffles 6′, or staggered baffles 6″, need not be disposed on both sides of the path 1″. Thus, in the embodiments of FIGS. 7 and 8, the parallel baffles 6′ are shown in the bottom portion only of the conduit 8, with the resistive coupling member 5‴ in the form of a planar sheet. A similar construction for staggered baffles 6″ is illustrated in FIGS. 9 and 10. The designs of FIGS. 7 through 10, indeed, are well suited for automotive or similar muffler purposes and can be fabricated in oval or substantially flat or even rectangular cross-section, as shown.

If one desired to increase the attenuation over a selected group of frequencies, such as the higher frequencies, a portion of the porous or other resistive coupling 5‴, say the right-hand end section, may be provided with a different value of resistance thereof, such as a lower resistance obtainable by larger pores. This technique may also be applied to the other embodiments of the invention.

Since, in the case of air-conditioning units and the like, very long duct lengths are available, smaller $\kappa$ ratios may be employed, say, of the order of 2 or above.

In order to increase the attenuation at the beginning of the muffler, so that the muffler becomes optimally effective for the lowest frequency of interest, it is possible to insert into the initial portion of one of the two paths, a phase-shifting acoustic network, so that the wave enters the slower velocity or shorter wavelength path with an immediate phase lag of up to almost 180°. The attenuation in the first quarter wavelength of muffler will then be maximized, and throughout this quarter wavelength of the muffler the damping can rise to as much as 200 decibels per wavelength. While this phase-shifting can be accomplished in all of the embodiments of the invention, it is shown, for illustrative purposes, in FIG. 6. A particular type of phase-shifter is illustrated in the form of a tuned cavity region 10 provided with re-entrant apertures 12 for producing the desired initial phase lag in the path 3″. Other types of phase-changing devices may also, of course, be employed.

In FIG. 11, the resistive wall 5″ is, as a further modification, illustrated as formed of powdered or granular catalytic material, such as vanadium-pentoxide-coated material, for simultaneously converting carbon monoxide exhaust into harmless carbon dioxide. If the added pressure drop can be tolerated, the exhaust end (or other portion) of the path 1″ may also be filtered through a barrier 15 of such catalytic or other porous structure.

Figure 4:
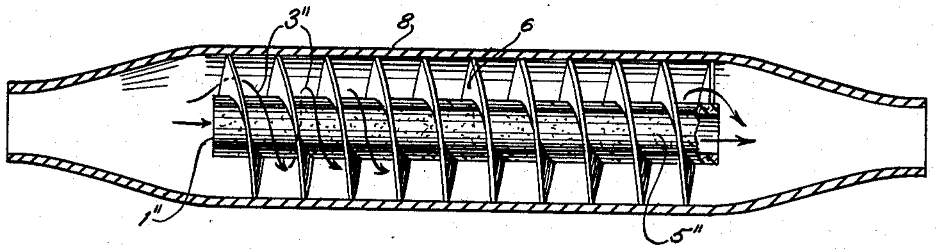
FIGS. 4 to 6 and 14 to 16 are similar views of further modifications.
Figure 14:
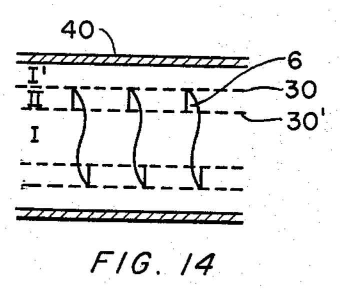

As still a further modification, a helical baffle structure 6, similar to that discussed in connection with the embodiment of FIG. 4, may be disposed between two porous resistive sheets such as the concentric tubular cylinders 30, 30′ of FIG. 14 disposed within a conduit 40. These sheets, like the resistive material 5, 5′, 5″, 5‴, before mentioned, may also be of the type described in British Patent No. 800,103, published August 20, 1958, involving resistive layers laminated to a thin perforated carrier sheet, or an appropriately perforated thin sheet. The straight path now becomes divided or split into two sub-paths; an inner high-speed sub-path I and an outer high-speed sub-path I′, coupled resistively to the spiral low-speed path II. The total cross-sectional area of path I—I′ will then correspond to the cross-sectional area of, for example, subdivided path 1″ of FIG. 4.

Figure 15:
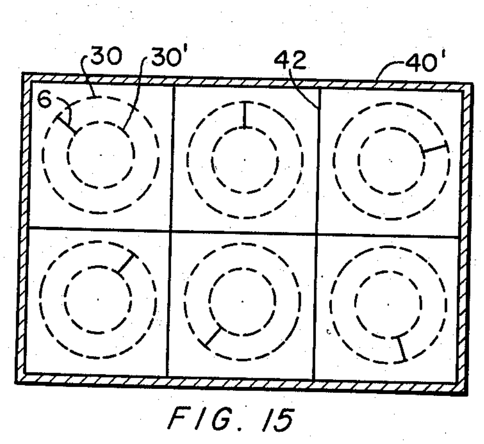

The structure 30—6—30′, moreover, could be inserted in any shape duct and, indeed, a plurality of such structures might well be installed in an air condition duct 40′ or the like, as shown in FIG. 15, preferably, though not essentially separated by solid partitions 42.

Figure 16:
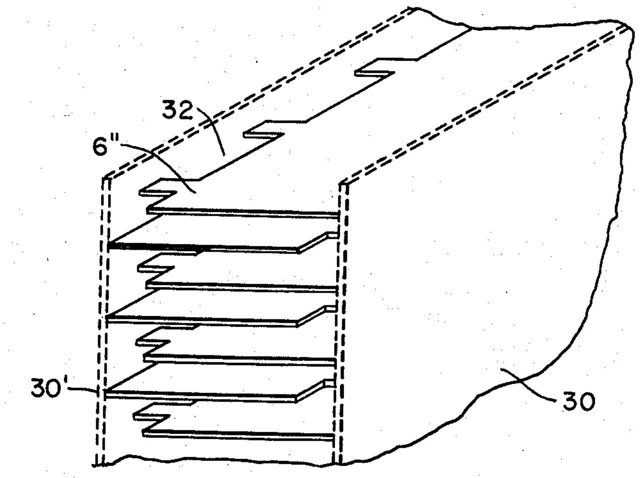

As still a further illustration, the structure 30—6—30′ is modified in FIG. 16 to employ staggered baffles 6″ between planar porous resistive sheets 30 and 30′, the baffles 6″ being apertured at 32 to provide for the zig-zag path thereabout.

In the case of the spiral modification of FIGS. 2 and 3, the velocity of sound transversely to the axis of the muffler is different from that along the longitudinal axis thereof; i.e., the path 3′ acts effectively anisotropically to the sound energy. Whereas the previously indicated optimum ranges of the parameter ratios $x$ and $x'$ apply for substantially isotropically acting paths, it has been found that, in paths that effectively perform in such anisotropic manner, the optimum range of $x$ or $x'$ is from about 0.10 to about 1.0, for the values of $\kappa$ above-discussed.

As an example, a non-optimized experimental muffler, thirty inches long, of the type illustrated in FIGS. 2 and 3, designed for the higher audio-frequency range, having a ratio $x'$ of approximately 0.5, and a spiral-path cross-sectional area $S_3$ of about four square inches, employing a resistance coupling 5′ of approximately $4\rho c$, produced an attenuation exceeding about 50 decibels from about 1000 cycles up to 10,000 cycles (with a maximum of about 62 decibels), and a gradually increasing attenuation ranging from about 20 decibels at 400 cycles up to 50 decibels at 1000 cycles. Halving the resistance 5′ was found to shift the attenuation response to a higher frequency by about one-third of an octave and increased the high-frequency attenuation to a maximum of about 72 decibels, with an average attenuation above 1200 cycles of about 60 decibels.

Further modifications will occur to those skilled in the art and all such are considered to fall within the spirit and scope of the invention as defined in the appended claims.

What is claimed is:

1. Apparatus having, in combination, means defining first and second adjacent conduits for conducting vibrational energy from one region to another region with substantially different wavelengths measured along the shortest distance between said regions, said means having a vibartional energy flow coupling between said conduits at predetermined positions on the adjacent conduit bounaries along a substantial portion of said distance, and having vibrational energy absorption means of substantial acoustic impedance located substantially only at said coupling positions for attenuating said vibrational energy only at said positions.

2. The apparatus of claim 1, said predetermined coupling positions extending along substantially the entire distance between said regions.

3. The apparatus of claim 1, said conduits being tubular.

4. The apparatus of claim 1, one of said conduits being longer than the other between said regions.

5. The apparatus of claim 1, one of said conduits being circuitous with respect to the other conduit.

6. The apparatus of claim 1, one of said conduits being helically wound with respect to the other conduit.

7. The apparatus of claim 6, said vibrational energy flow coupling comprising helical slot means.

8. The apparatus of claim 7, said absorption means comprising means at said slot means having substantial acoustic resistivity.

9. The apparatus of claim 1, said absorption means having substantial acoustic resistivity.

10. The apparatus of claim 1, one of said conduits being substantially straight and the other of said conduits comprising a baffled member.

11. The apparatus of claim 10, said absorption means comprising an acoustically resistive wall bounding the substantially straight conduit, at least in part.

12. The apparatus of claim 10, said baffled member having baffles which are substantially parallel to one another.

13. The apparatus of claim 10, said baffled member having baffles which are staggered with respect to one another.

14. The apparatus of claim 1, the ratio of said different wavelengths being at least of the order of substantially 2.

15. The apparatus of claim 1, the ratio of the cross-dimensions of the conduits being greater than unity.

16. The apparatus of claim 15, said ratio lying within the range of from substantially 2 to substantially 2.5.

17. The apparatus of claim 15, said different wavelengths having a ratio of at least substantially 5.

18. The apparatus of claim 15, the effective ratio of the acoustic resistance of said absorption means to the reactance of one of said conduits lying within the range of substantially 1 to substantially 4.

19. The apparatus of claim 1, said conduits having different vibrational energy propagation velocities, the ratio $\gamma$ of effective resistance R′ of the absorption means to the reactance of the slower-velocity conduit being determined by substantially the following relationship:

$$\gamma = \frac{1}{c_0}\omega d_2 \kappa^2 R'$$

where $c_0$ is the velocity of vibrational-wave propagation in the other conduit, $\omega$ is the lowest angular velocity at which high damping is desired, $d_2$ is the cross-dimension of the slower-velocity conduit, and $\kappa$ is the ratio of velocities in the conduits.

20. The apparatus of claim 19, in which $\gamma$ has a value lying within the range of substantially 1 to substantially 4.

21. The apparatus of claim 1, said conduits having different vibrational energy propagation velocities, the ratio $\gamma$ of effective resistance R′ of the absorption means to the reactance of the slower-velocity conduit being determined by substantially the following relationship:

$$\gamma = \frac{R' \omega S_2 \kappa^2}{c_0 h_3}$$

where $c_0$ is the velocity of vibrational-wave propagation in the other conduit, $\omega$ is the lowest angular velocity at which high damping is desired, $S_2$ is the cross-sectional area of the said lower-velocity conduit, $\kappa$ is the ratio of velocities in the conduits, and $h_3$ is the width of the said flow coupling.

22. The apparatus of claim 21, in which $\gamma$ has a value lying within the range from substantially 1 to substantially 4.

23. The apparatus of claim 1, said absorption means comprising a pair of spaced acoustically resistive walls bounding one of said conduits.

24. The apparatus of claim 23, said walls being cylindrical.

25. The apparatus of claim 24, said one conduit being substantially helical.

26. The apparatus of claim 23, said resistive walls being substantially planar.

27. The apparatus of claim 26, said one conduit being substantially zig-zag in contour.

28. The apparatus of claim 1, said absorption means having substantial acoustic resistivity which varies with acoustic frequency.

29. The apparatus of claim 1, said absorption means having substantial acoustic resistivity which decreases with increasing acoustic frequency.

30. The apparatus of claim 1, said absorption means having substantial acoustic resistivity which is different at different coupling positions.

31. The apparatus of claim 1, one of said conduits having different transverse and longitudinal vibrational energy propagation velocities, the ratio of the cross-sectional areas of said conduits lying within the range of from about 0.10 to about 1.0.

References Cited in the file of this patent

UNITED STATES PATENTS

| | | |
|---|---|---|
| 956,906 | Sizer | May 3, 1910 |
| 1,638,309 | Kemble | Aug. 9, 1927 |
| 2,247,130 | McCurdy | June 24, 1941 |

FOREIGN PATENTS

| | | |
|---|---|---|
| 483,889 | Italy | Aug. 17, 1953 |
| 309,673 | Switzerland | Nov. 16, 1955 |
| 1,136,141 | France | Dec. 22, 1956 |
| 1,153,298 | France | Sept. 30, 1957 |